April 5, 1932.   C. W. MANSUR   1,852,814
METAL HUB AND THE LIKE
Filed May 21, 1930
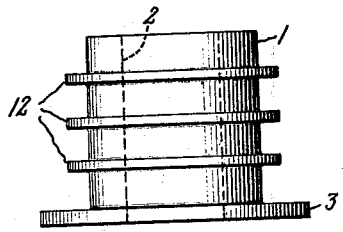
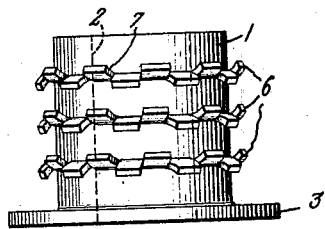
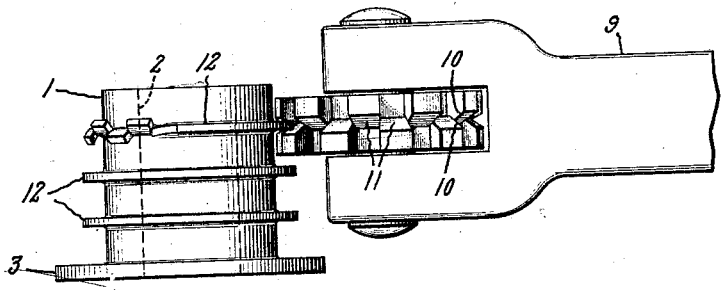
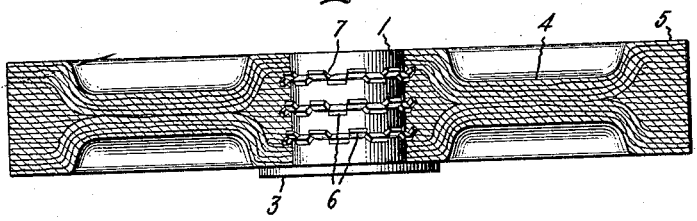
Inventor:
Clarence W. Mansur,
by Charles E. Tullar
His Attorney.

Patented Apr. 5, 1932

1,852,814

UNITED STATES PATENT OFFICE

CLARENCE W. MANSUR, OF MALDEN, MASSACHUSETTS, ASSIGNOR TO GENERAL ELECTRIC COMPANY, A CORPORATION OF NEW YORK

METAL HUB AND THE LIKE

Application filed May 21, 1930. Serial No. 454,463.

The present invention relates to metal hubs or the like. An application of the invention is in connection with metal hubs such as are used in molded non-metallic gear wheels, the hub being molded into the center of the gear wheel web, and in the drawings and following specification I have specifically illustrated and described this embodiment of my invention. It is to be understood, however, that the invention is not limited to metal hubs for gear wheels but may be used wherever found applicable.

The object of my invention is to provide an improved construction and arrangement in a device of the above character, and for a consideration of what I believe to be novel and my invention, attention is directed to the following specification and the claims appended thereto.

In the drawings, Fig. 1 is a side view of a partially completed metal hub intended for use as a metal hub of a non-metallic gear wheel; Fig. 2 is a view illustrating the manner in which a structure embodying my invention may be constructed; Fig. 3 is a side view of a completed hub; and Fig. 4 is a sectional view through a non-metallic gear wheel having a hub embodying the invention.

Referring to the drawings, Figs. 3 and 4, 1 indicates a hub having a central shaft opening 2 and a flange 3. The hub is shown in Fig. 4 as forming a part of a molded non-metallic gear wheel blank, the web of which is indicated at 4 and the rim of which is indicated at 5.

According to my invention, I provide the outer surface of the hub with one or a plurality of circumferentially extending rows of teeth 6 formed integral with the hub, the teeth of each row being bent at angles to the plane of the row, some of the teeth being bent to one side of the plane of the row and other of the teeth being bent to the other side thereof. The bent teeth thus overlie the surface of the hub to form therewith pockets. The teeth have flat radially extending end surfaces 7. Preferably successive teeth are bent to opposite sides of the plane of the row as shown in Figs. 3 and 4.

By this construction I provide a hub which when molded as a part of a non-metallic gear wheel has a very firm rigid connection with the molded material, since the molded material is pressed around the teeth and under the sloping sides thereof. Since the molded material is located under the sloping sides of the teeth, the bond is very effective in resisting load applied to the molded material in a radial direction.

In a gear wheel of this type, it is important that the metal hub be connected to the molded portion of the gear wheel in a manner such that under load the molded portion of the gear wheel will not loosen or turn on the hub. My invention is especially advantageous in this respect because due to the teeth extending angularly in both directions from the plane of the rows of teeth and due to the flat end surfaces 7, radially extending holding surfaces of substantial area are provided for preventing turning of the molded portion of the wheel on the hub. Also, since surfaces 7 are radial, they do not have a tendency to press the molded-on material away from the hub as is the case with a sloping surface.

I have found that by the use of a construction embodying my invention, I may utilize a hub somewhat lighter than heretofore, a thing of especial advantage in the case of a rotating body such as a gear wheel, in that it reduces the moment of inertia of the body. Also, I have found that I am enabled to obtain a strong and satisfactory connection between the hub and molded material with a smaller mass of material concentrated around the hub than has been possible heretofore. In addition, I have found that a good bond is obtained in the case of molding in a mold in a direction parallel to the axis of the hub.

The construction has the important advantage also that it is capable of being manufactured on a screw machine at low cost. As one method of manufacture, I take a piece of metal of suitable shape and first form on it the flange 3 and one or more projecting rings as shown at 12 in Fig. 1. The rings may be formed by cutting grooves in the hub. I then operate on these rings with a cutting and bending tool as shown at 9 in Fig. 2, the tool having a cutting and bending knife, the cutting edges being indicated at 10 and the bending surfaces being indicated at 11. The tool may form a part of a screw machine and there may be as many cutting and bending knives as there are rings 7 to be operated upon. As the tool and hub are turned relatively to each other as shown in Fig. 2, the opposed cutting edges 10 cut the teeth and the bending surfaces 11 bend them first in one direction and then the other from the plane of the ring. This method of manufacture is a simple one and one which can be carried out at low cost.

In accordance with the provision of the patent statutes, I have described the principle of operation of my invention, together with the apparatus which I now consider to represent the best embodiment thereof; but I desire to have it understood that the apparatus shown is only illustrative and that the invention may be carried out by other means.

What I claim as new and desire to secure by Letters Patent of the United States is:

1. A metal hub or the like having a surface with one or more rows of teeth projecting radially therefrom, the teeth of each row being bent some to one side of the plane of the row and others to the other side of the plane of the row.

2. A metal hub or the like having a surface with one or more rows of teeth projecting radially therefrom, successive teeth of each row being bent to opposite sides of the plane of the row.

3. A metal hub or the like having a surface with one or more rows of teeth projecting radially therefrom, the teeth of each row being bent some to one side of the plane of the row and others to the other side of the plane of the row, said teeth having radially extending flat end surfaces.

4. A metal hub or the like having its surface provided with one or more annular rings, said rings being cut transversely at spaced points to provide teeth, and said teeth being shaped to overlie the surface of the hub to form therewith pockets for the reception of moulded material mounted on the hub.

5. A metal hub having teeth projecting from its outer surface, said teeth being shaped to form with the surface of the hub pockets for the reception of material moulded on the hub, and to present end surfaces for engagement with material moulded on the hub to hold the hub and material from circumferential movement relatively to each other.

6. In combination, a metal hub having a surface with one or more rows of teeth projecting radially therefrom, the teeth of each row being bent some to one side of the plane of the row and others to the other side of the plane of the row, and material moulded on the hub and embedded around and beneath said teeth.

7. A metal hub or the like having a surface with one or more rows of teeth projecting radially therefrom, teeth of each row being bent to one side of the plane of the row to overlie the surface of the hub.

In witness whereof, I have hereunto set my hand this 20th day of May, 1930.

CLARENCE W. MANSUR.